United States Patent [19]
Shih et al.

[11] Patent Number: 5,898,050
[45] Date of Patent: Apr. 27, 1999

[54] POLYOLEFINE COMPOSITION AND POLYOLEFINE FILMS PREPARED FROM THE SAME

[75] Inventors: Hsi-Hsin Shih; Chien-Tsung Wu, both of Taichung; Chang-Ming Wong, Hsinchu Hsien; Chi-Chou Huang, Taichung, all of Taiwan

[73] Assignee: Industrial Technology Research Institute, Hsinchu, Taiwan

[21] Appl. No.: 08/865,906

[22] Filed: May 30, 1997

[30] Foreign Application Priority Data

Apr. 28, 1997 [TW] Taiwan ................................. 86105580

[51] Int. Cl.⁶ ............................... C08L 23/04; C08F 8/00
[52] U.S. Cl. .......................... 525/240; 525/191; 525/201; 525/232; 525/242
[58] Field of Search ..................................... 525/191, 201, 525/232, 240, 242, 370, 322, 324

[56] References Cited

U.S. PATENT DOCUMENTS 4,871,813  10/1989  Senez ..................................... 525/240

*Primary Examiner*—Nathan M. Nutter
*Attorney, Agent, or Firm*—W. Wayne Liauh

[57] ABSTRACT

A polyolefine composition for preparing a polyolefine film having high heat-sealing properties. The polyolefine composition includes from about 2 percent to about 35 percent by weight of metallocene polyethylene or its copolymer and from about 65 percent to about 98 percent by weight of polypropylene or its copolymer. The metallocene polyethylene or its copolymer has a long chain branching index between 0 and 20/1000 carbons, a density between 0.880 g/cm³ and 0.915 g/cm³, a melting index between 0.5 g/10 min and 30 g/10 min, and a molecular weight distribution of less than 3.5. The polyolefine composition is fabricated into films by the blown film method or casting laminated method.

8 Claims, No Drawings

POLYOLEFINE COMPOSITION AND POLYOLEFINE FILMS PREPARED FROM THE SAME

BACKGROUND OF THE INVENTION

1. Field of the Invention

The present invention relates to a polyolefine composition and to a polyolefine film prepared from the same. More particular, it relates to polyolefine composition containing polyethylene or its copolymer and polypropylene or its copolymer and a polyolefine film having heat-sealing property.

2. Description of the Related Arts

Polyolefine films, in particular films prepared from polypropylene have been employed as wrapping and packaging materials for a variety of product such as instant noodles, compact disks(CD), and shirts. However, this kind of film has high sealing or high heat-sealing temperature and low heat-sealing strength, and thus the wrapping or packaging efficiency using such a film is low.

SUMMARY OF THE INVENTION

It is therefore an object of the invention to provide a polyolefine composition which is suitable for preparing a film having low heat-sealing temperature and high-sealing properties so as to improve its wrapping or packaging efficiency.

The object of the invention is attained by providing a polyolefine composition which includes 2 percent to 35 percent by weight of metallocene polyethylene or its copolymer and 65 percent to 98 percent by weight of polypropylene or its copolymer. Note the metallocene polyethylene or its copolymer suitable for use in the invention has a long chain branching index between 0 and 20/1000 carbons, a density between 0.880 g/cm$^3$ and 0.915 g/cm$^3$, a melting index between 0.5 g/10 min and 30 g/10 min, and a molecular weight distribution of less than 3.5.

DETAILED DESCRIPTION OF THE INVENTION

The polyolefine compositions of the invention are prepared by blending 2 percent to about 35 percent by weight of metallocene polyethylene or its copolymer and 65 percent to 98 percent of polypropylene or its copolymer.

The polyethylene or its copolymer, preferably, constitutes from 10 percent to 20 percent by weight of polyolefine composition prepared using a metallocene catalyst. The ethylene copolymer is a copolymer of ethylene and olefines containing at least three carbons such as butene, hexene, or octene also prepared using a metallocene catalyst. The polypropylene copolymer is a copolymer of propylene and ethylene.

The polyolefine films of the invention can be prepared by conventional methods such as the blown film method or casting lamination method.

The examples which follow illustrate the invention without implying any limitation.

EXAMPLES 1–4

5, 10, 15, and 20 percent by weight of metallocene polyethylene(mPE) were blended with polypropylene(PP) to form blends. The amounts of the polyproylene used in percent by weight are indicated in Table 1.1. The blends were then fabricated into films having a thickness of about 20±5 μm at a operating temperature between 160° C. and 200° C. by using the blown film method.

Hot tack

Each of the films was cut into two test specimens of the same size. The two specimens were then laminated together by heating at 140° C., 143° C., 145° C., and 150° C. while a pressure of 2 kg/cm$^2$ was applied to an area of 15 mm×15 mm for less than 1 second. The two specimens which had been laminated together, were then pulled apart immediately after applying the pressure and within 1 second. The hot tack strengths in the transverse direction and machine direction were measured, and the results are listed in Table 1.2 below.

Heat-sealing strength

Each of the films was cut into two test specimens of the same size. The two specimens were then laminated together by heating at 130° C., 140° C., 145° C., 150° C. and 155° C. while a pressure of 2 kg/cm$^2$ was applied to an area of 15 mm×15 mm for less than 1 second. The two specimens which had been laminated together, were then cooled to room temperature and pulled apart. The heat-sealing strengths in the transverse direction and machine direction were measured, and the results are listed in Table 1.3 below.

TABLE 1.1

|       | Example 1 | Example 2 | Example 3 | Example 4 |
|-------|-----------|-----------|-----------|-----------|
| mPE   | 5         | 10        | 15        | 20        |
| PP    | 95        | 90        | 85        | 80        |

TABLE 1.2

| Hot tack (g) | Example 1 | | Example 2 | | Example 3 | | Example 4 | |
|---|---|---|---|---|---|---|---|---|
| Temp (° C.) | TD | MD | TD | MD | TD | MD | TD | MD |
| 140 | 100 | 100 | 150 | 150 | 150 | 150 | 100 | 100 |
| 143 | 175 | 150 | 200 | 175 | 200 | 200 | 225 | 200 |
| 145 | 100 | 125 | 175 | 125 | 200 | 175 | 175 | 150 |
| 150 | 50 | 50 | 100 | 100 | 100 | 75 | 50 | 75 |

TD: Transverse Direction
MD: Machine Direction

TABLE 1.3

| Heat-sealing strength (kg) | Example 1 | | Example 2 | | Example 3 | | Example 4 | |
|---|---|---|---|---|---|---|---|---|
| Temp (° C.) | TD | MD | TD | MD | TD | MD | TD | MD |
| 130 | 0.042 | 0.047 | 0.069 | 0.076 | 0.083 | 0.062 | 0.050 | 0.052 |
| 140 | 0.795 | 0.564 | 0.820 | 0.588 | 0.851 | 0.903 | 0.668 | 0.592 |
| 145 | 1.236 | 1.437 | 1.549 | 1.486 | 1.300 | 1.548 | 1.288 | 1.413 |
| 150 | 1.268 | 1.397 | 1.451 | 1.335 | 1.114 | 1.208 | 1.180 | 1.320 |
| 155 | 1.240 | 1.249 | 1.130 | 1.186 | 1.323 | 1.033 | 1.108 | 1.208 |

Comparative Examples

Polypropylene films having a thickness of about 20±5 μm were fabricated at an operating temperature of between 160° C. and 200° C. by the blown film method. The hot tack and heat-sealing strength of the films were measured in with the procedures as set forth in Examples 1–4 results are listed in Table 2.1 and Table 2.2 below.

TABLE 2.1

| Hot tack (g) | Comparative Example | |
|---|---|---|
| Temp (° C.) | TD | TD |
| 140 | 75 | 50 |
| 143 | 125 | 125 |
| 145 | 75 | 75 |
| 150 | 50 | 50 |

TABLE 2.2

| Heat-sealing strength (kg) | Comparative Example | |
|---|---|---|
| Temp (° C.) | TD | TD |
| 130 | 0.024 | 0.014 |
| 140 | 0.151 | 0.149 |
| 145 | 1.026 | 0.619 |
| 150 | 1.334 | 1.522 |
| 155 | 1.022 | 0.996 |

It is seen from the above tables that the films prepared from the polyolefine composition of the invention have higher heat-sealing strength and hot tack in both the machine direction and transverse direction as compared to the films prepared from polypropylene. Moreover, the films of the invention have a lower heat-sealing temperature and thus the processing window is larger. Accordingly, the wrapping or packaging efficiency using the films of the invention can be increased.

What is claimed is:

1. A polyolefine composition comprising:

from 2 percent to 35 percent by weight of a polyethylene or its copolymer, having a long chain branching index between 0 and 20/1000 carbon, a density between 0.880 g/cm$^3$ and 0.915 g/cm$^3$, a melting index between 0.5 g/10 min and 30 g/10 min, and a molecular weight distribution of less than 3.5; and from 65 percent to 98 percent by weight of a polypropylene or its copolymer.

2. The composition as claimed in claim 1, wherein said metallocene polyethylene or its copolymer constitutes from 10 percent to 20 percent by weight of said composition.

3. The composition as claimed in claim 1, wherein said metallocene polyethylene copolymer is a copolymer of ethylene and olefine containing at least three carbons.

4. The composition as claimed in claim 1, wherein said metallocene polyethylene copolymer is a copolymer of ethylene and butene.

5. The composition as claimed in claim 1, wherein said metallocene polyethylene copolymer is a copolymer of ethylene and hexene.

6. The composition as claimed in claim 1, wherein said metallocene polyethylene copolymer is a copolymer of ethylene and octene.

7. The composition as claimed in claim 1, wherein said polypropylene copolymer is a copolymer of propylene and ethylene.

8. A polyolefine film prepared from the composition as claimed in claim 1.

* * * * *